United States Patent

Yim

[11] Patent Number: 5,189,947
[45] Date of Patent: Mar. 2, 1993

[54] RICE AND VEGETABLE STEAMER

[75] Inventor: Yung S. Yim, Shatin, Hong Kong

[73] Assignee: Chiaphua Industries Limited, Hong Kong

[21] Appl. No.: 905,436

[22] Filed: Jun. 29, 1992

[51] Int. Cl.[5] .................. A47J 27/04; F27D 11/00
[52] U.S. Cl. ........................ 99/415; 99/418; 99/450; 126/369; 219/401; 219/438; 392/386
[58] Field of Search ..................... 99/410–418, 99/403, 448, 446, 450, 516, 339, 331; 126/369, 381, 20; 426/510, 511; 219/401, 441, 442, 426, 438, 535; 392/386

[56] References Cited

U.S. PATENT DOCUMENTS

| | | | |
|---|---|---|---|
| 279,956 | 8/1985 | Eyck et al. | |
| 869,903 | 11/1907 | Harloe | 126/369 |
| 925,781 | 6/1909 | Mathy | |
| 2,089,411 | 8/1937 | Olsson et al. | 99/415 |
| 2,715,898 | 8/1955 | Michaelis et al. | 126/369 |
| 2,718,842 | 9/1955 | Klemm | 126/369 |
| 3,275,801 | 9/1966 | Churchill | |
| 3,869,595 | 3/1975 | Collins et al. | 219/442 |
| 4,045,653 | 8/1977 | Soper et al. | |
| 4,052,590 | 10/1977 | Anderl et al. | |
| 4,115,918 | 9/1978 | Anderl et al. | |
| 4,148,250 | 4/1979 | Miki et al. | 99/403 |
| 4,197,791 | 4/1980 | Vieceli et al. | 99/448 |
| 4,452,132 | 6/1984 | Miller et al. | 99/516 |
| 4,509,412 | 4/1985 | Whittenburg et al. | |
| 4,605,840 | 8/1986 | Koopman | 219/401 |
| 4,650,968 | 3/1987 | Williams | 126/20 |
| 4,920,251 | 4/1990 | Whitenack et al. | 392/386 |
| 5,097,753 | 3/1992 | Naft | |

FOREIGN PATENT DOCUMENTS 270722 9/1912 Fed. Rep. of Germany ...... 219/401

Primary Examiner—Timothy F. Simone
Attorney, Agent, or Firm—Kerkam, Stowell, Kondracki & Clarke

[57] ABSTRACT

A steam cooker having a high capacity heating element in the bottom wall of the cooker reservoir employs a body of heat conducting metal to define a shallow boiler for transferring heat to water in the reservoir from a metal sheathed electric resistant heating element extending in a generally circular groove in the bottom of the metal body with the terminal end portions of the heating element extending in generally radially overlapping relation. An annular recess formed in the top surface of the metal body has a first portion of uniform depth defined by a first substantially planar bottom wall portion and a second portion of varying depth defined by a second substantially planar bottom wall portion overlaying the overlapped end portions of the heating element and inclined with respect to the first wall portion whereby water in the water reservoir will have a greater depth above the first bottom wall portion than above the second bottom wall portion.

4 Claims, 3 Drawing Sheets

RICE AND VEGETABLE STEAMER

BACKGROUND OF THE INVENTION

1. Field of the Invention

This invention relates to an improved steam cooker for rice and vegetables and more particularly to such a steam cooker including an improved electric heater unit for boiling water in a reservoir in the cooker.

2. Description of the Prior Art

The popularity of steam cooking utensils for use in the preparation of fresh vegetables, rice and the like has grown rapidly in recent years as the general population has become more conscious of the need for a healthy, well-balanced diet. Steam cookers now available on the market for home use generally employ relatively high wattage electric heaters mounted in the bottom of a water reservoir to quickly generate steam and thereby reduce the time required for cooking. The heaters employed in known steam cookers of this type generally have not been entirely satisfactory, however, for various reasons. For example, heaters having a relatively deep "well" or boiler chamber similar to those employed in electric percolators may quickly heat the relatively small volume of water in the boiler, but can produce relatively violent localized boiling action which may result in excessive water being carried into contact with the food being cooked. Further, since only a relatively small volume of water is in the boiler at any one time, a substantial period may be required to heat all the water in the reservoir to the desired temperature for fast, uniform cooking.

Heating units which employ a larger heating surface in contact with the water in the reservoir are also known. Such units generally employ a large metal heat sink and heat substantially the entire volume of water to or near the boiling point before cooking can commence. Attempts to reduce this startup time by using heater elements of higher capacity (higher wattage) generally result in a higher overshoot temperature which, again, may result in more violent localized boiling action and can result in a shortened life for the heating element.

DESCRIPTION OF THE PREFERRED EMBODIMENT

In accordance with the present invention, the foregoing and other disadvantages of the prior art steam cookers are overcome by providing a high capacity heating element which enables the rapid, uniform heating of water in the cooker reservoir to produce the steam required for cooking without undesired violent localized boiling action and without excessive temperature overshoot. This is achieved in a heater employing a body of heat-conducting metal of relatively small mass to define a relatively large diameter, shallow boiler for transferring heat from a metal sheathed electric resistance heating element extending in a generally circular groove in the bottom of the metal body. The terminal end portions of the sheathed heating element are disposed in generally radially overlapping relation in the groove.

The shallow boiler portion of the heater is in the form of an annular recess in the top or inner surface of the metal body, with the bottom wall of the recess including a first substantially horizontal planar portion providing a uniform water depth and a second portion of uniformly varying depth defined by a second substantially planar wall portion inclined with respect to the first portion. The first and second wall portions of the boiler intersect substantially along a diameter of the annular recess, with the inclined wall portion overlying the overlapped, normally cooler end portions of the heating element and provide a more shallow depth of water in the water reservoir in this area.

As is known, the terminal end portions of a metal sheathed heating element of this type are the coldest portion of the heating element, while the center section of the heating element, which in this case lies beneath that portion of the boiler which is of uniform depth, is the hottest section. The greater volume of water disposed above the hotter section is thus available to absorb more heat while the inclined wall portion gradually reduce the amount of water absorbing heat in the area above the colder end sections of the heating element. As a result, the temperature of the water throughout the boiler section of the water reservoir will rise at a substantially uniform level and start to generate steam substantially simultaneously. As the water throughout the reservoir achieves a substantially stable temperature, as when heat transfer by convection and conduction are at a substantially stable state, the temperature of the entire boiler surface and water at the interface will be the same and the water will boil above the entire heater body. This more uniform heating enables the use of a higher wattage heating element to produce a substantially uniform water temperature during the initial heatup stages while the smaller mass of the heater metal body will avoid excessively high overshoot temperatures of the heater.

Other features and advantages of the invention will be apparent from the detailed description contained hereinbelow, taken in conjunction with the drawings, in which.

DESCRIPTION OF THE PREFERRED EMBODIMENT

Figure 1:
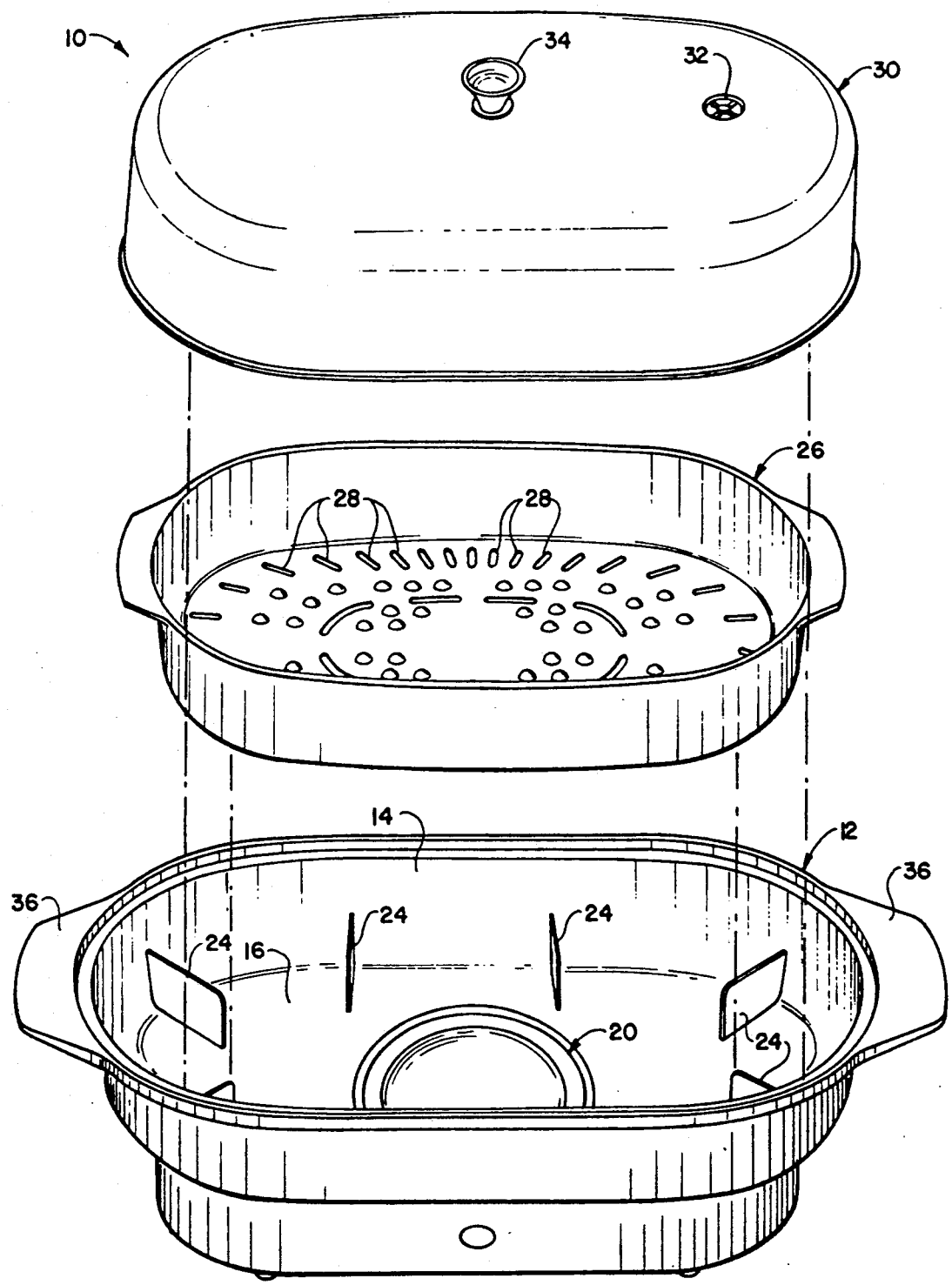
FIG. 1 is an exploded isometric view of a steam cooker embodying the present invention.

Referring now to the drawings in detail, a steam cooker embodying the present invention is indicated generally by the reference numeral 10 and includes an oblong, molded base member 12 having an integrally molded side and bottom walls 14, 16, respectively, cooperating to define a water reservoir 18. Bottom wall 16 has a central circular opening 19 extending therethrough in which is mounted a heater assembly 20, with a resilient gasket member 22 forming a watertight seal between the opening in the bottom wall and the outer periphery of the heating assembly.

A plurality of spaced, integrally formed gusset members 24 are molded with the bottom wall 16 and sidewall 14 to provide a support for a food container 26. Food container 26 preferably has a plurality of openings 28 formed in its bottom wall to permit steam to flow freely into the container for steaming vegetables and the like in the manner well known in the art. Also, the cooker preferably comes equipped with a second food container (not shown) without the openings 28 for cooking foods such as rice which would tend to clog or pass through the openings. A top cover 30 is provided for the base, and a vent 32 is provided in the cover to permit excess steam to escape. A central upwardly projecting knob or handle 34 is provided on top 30, and laterally projecting handles 36 are formed on the opposite ends of base 12 for lifting the assembly.

Figure 3:
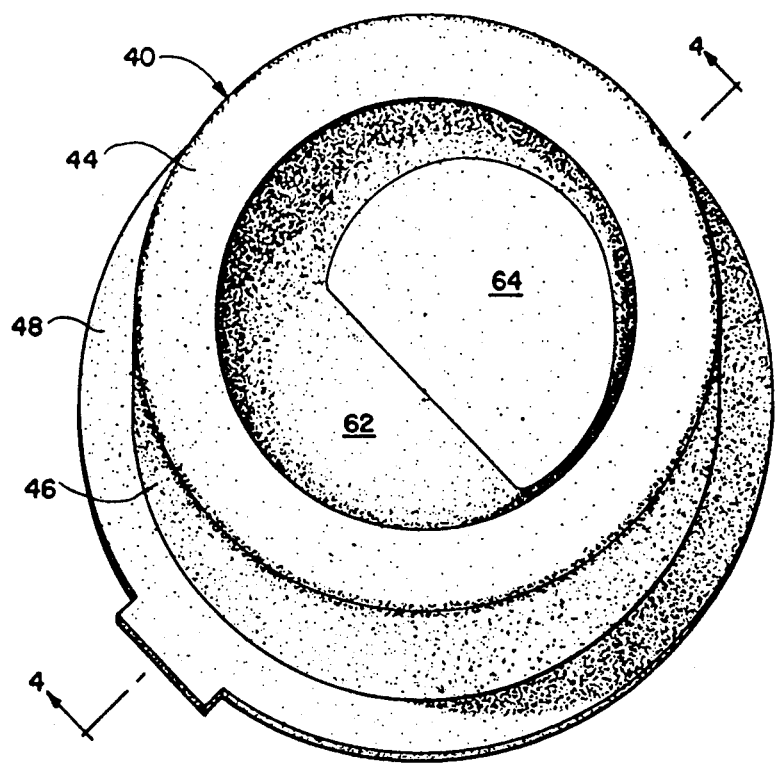
FIG. 3 is an enlarged isometric view of the heater unit employed in the cooker shown in FIGS. 1 and 2, as seen from above the heater.
Figure 4:
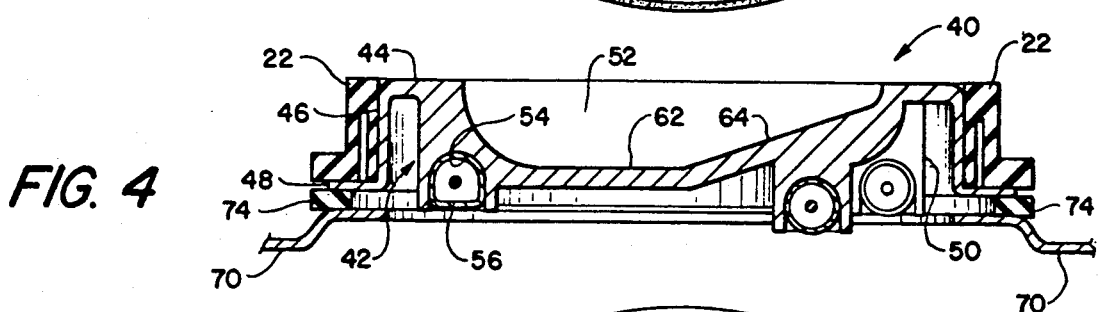
FIG. 4 is a sectional view taken along line 4—4 of FIG. 3.
Figure 5:
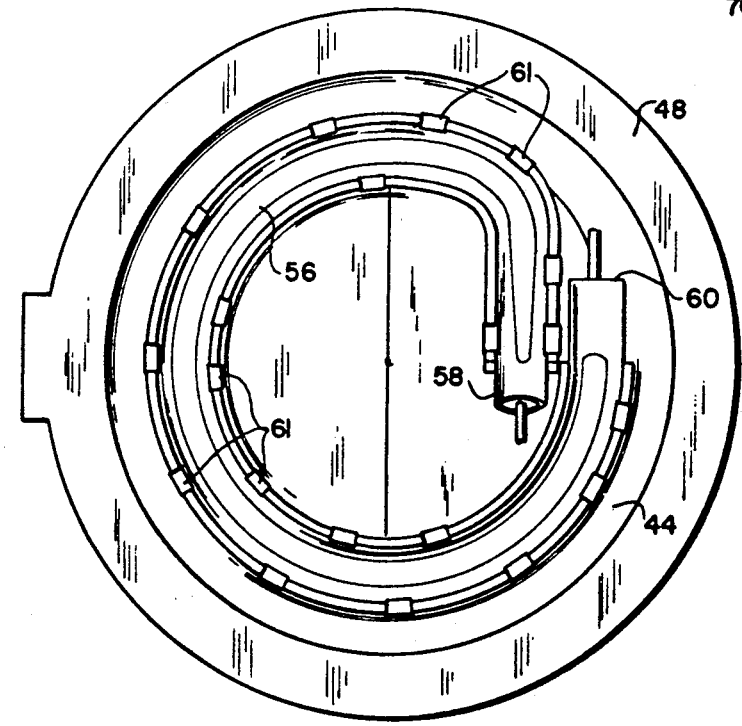
FIG. 5 is a bottom plan view of the heater unit shown in FIG. 3.

Referring now to FIGS. 3-5, a heating assembly employed in the steamer is indicated generally by the reference number 40 and comprises a central body portion 42 supported concentrically within the central opening 19 in bottom wall 16, in inwardly spaced relation to the opening, by an integrally formed spacer comprising a first horizontally extending relatively thin wall member 44, a generally cylindrical vertically extending wall member 46, a horizontal flange 48 adapted to underlie the bottom wall 16 adjacent the periphery of the central opening 19 therein.

As best seen in FIG. 4, the central metal body 42 of the heater 40 has a substantially cylindrical outer wall 50 extending in spaced relation to the inner surface of cylindrical wall 46 and has a recess or boiler 52 formed in its top or upwardly directed surface. A generally U-shaped groove 54 is formed in the bottom of the heating body and extends in a generally circular path therearound adjacent its outer periphery for receiving and supporting a metal sheathed electric resistance heating element 56. As best seen in FIG. 5, the metal sheathed heating element 56 extends in a generally circular path but has one terminal end portion 58 deflected inwardly to extend in generally overlying relation, in the radial direction, to its second end portion 60. The edge portions of the metal body are staked, as at 61, to retain heating element 56 in the groove 54 in metal-to-metal contact with the heater body 42.

The recess or boiler 52 in the heater body 42 has a substantially semicircular bottom wall portion 62 which extends in a generally horizontal direction to provide a uniform depth of the recess over substantially one-half its area and a second bottom wall portion 64 extending from wall portion 62 in an upwardly inclined relation to provide a uniformly varying depth for the recess 52 above this wall portion. The terminal end portions 58 and 60 of the elongated sheathed heater element 56 underlie the upwardly inclined bottom wall portion 64. It is also noted that a greater metal mass is provided in the bottom wall portion of body 50 in the vicinity of the overlapping end portions 62, 64 to provide a greater heat sink for absorbing heat from the overlapped end portions of heating element 56.

Figure 2:
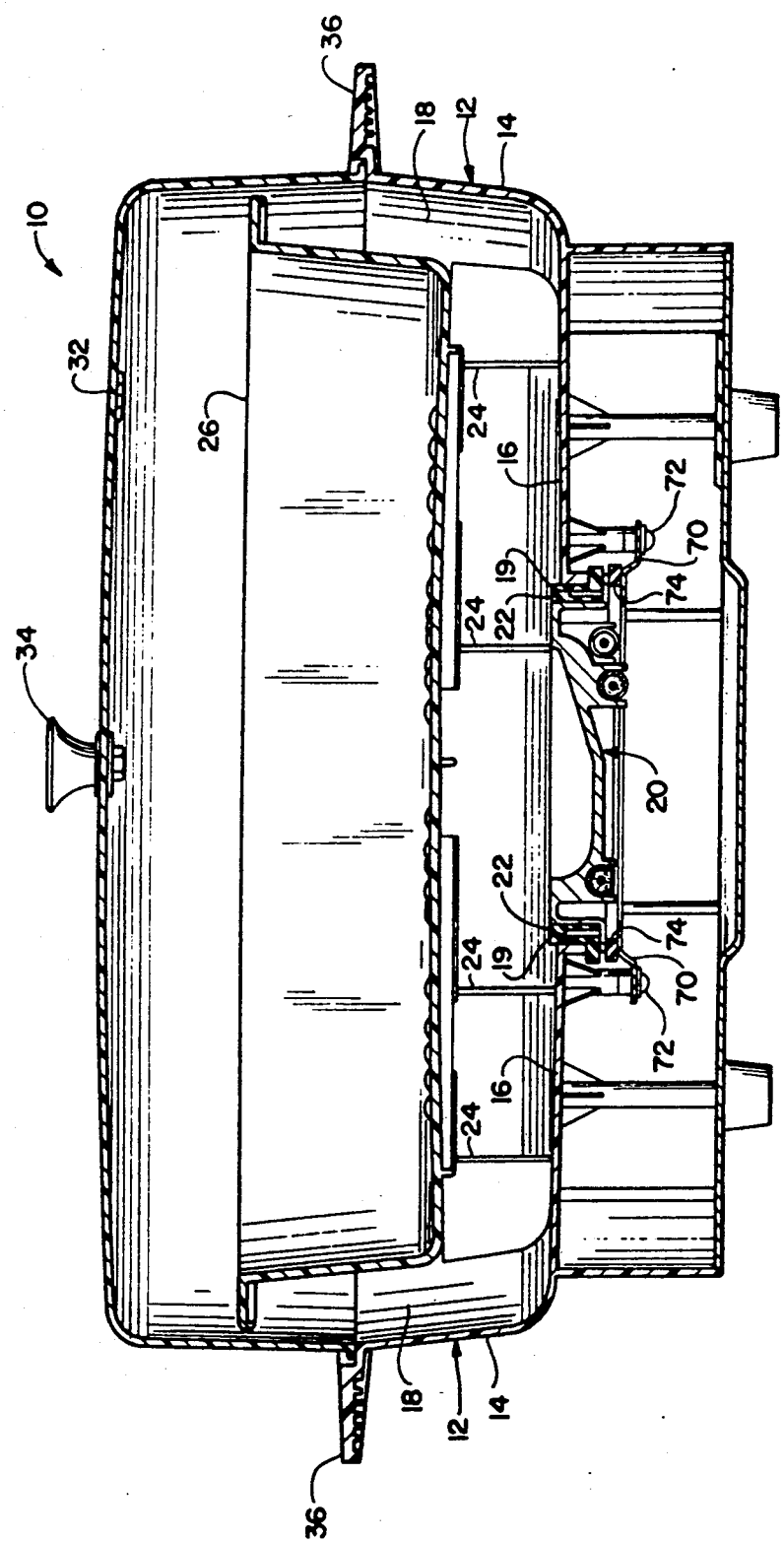
FIG. 2 is an enlarged elevational view, in section, showing the cooker of FIG. 1.

Referring again to FIG. 2, it is seen that the heater 40 is mounted in the opening 19 in bottom wall 16 by a metal retaining ring 70 and screws 72 which engage suitable bosses integrally molded on the outer surface of bottom wall 16. A resilient elastomeric gasket ring 22, having a generally L-shaped cross section, is supported in contact with the top surface of flange 48 and the outer surface of wall 46 to form a water-tight seal with the bottom wall, and a second gasket member 74 is positioned between the bottom surface of flange 48 and the retaining ring 70 to provide a uniform sealing pressure through flange 48 to the sealing gasket 22. The relatively thin metallic wall member 44 provides a spacer normally exposed to water within the reservoir 18 to limit the heat transfer from the electric resistance heating element 56 to the resilient gasket 22. Also, the wall member 44, the outer cylindrical wall 50 of the body 42 and the outer surface of vertical wall 46 cooperate to form a downwardly open channel which acts as an insulator reducing the heat transfer of the heater element to the sealing gasket through the ring or wall 46.

As is well known, an elongated sheathed electrical resistance heating element such as element 56 will heat faster and reach a higher temperature in its central portion, i.e., the portion spaced from the ends such as end portions 58, 60. By arranging the ends in overlapping relation, in a generally radial direction as shown in FIG. 5, the colder terminal end portions of the heating elements will cooperate to provide additional heat in this area. Also, by arranging the overlapped cooler portions of the heating element beneath the most shallow portion of the recess 52, i.e., substantially diametrically opposed from the section of uniform depth, it has been found that more uniform heating of water within the reservoir is achieved during initial heatup of the unit.

By providing a greater depth above the central portion of the heating element, a greater volume of water is thus available to absorb heat from this faster heating section. Conversely, the more shallow construction in the area above the slower heating end portions of the heating element will provide less water to absorb heat in this area, with the result that there will be a tendency for the water to commence to boil at more nearly the same time above the entire surface of the boiler section 42. Thereafter, as heat transfer by convection and conduction reach a substantially stable state, the temperature of the boiler surface and water in contact with this surface will be the same and the water above the boiler will be boiling at a substantially uniform rate. This more stable state is also promoted by the slightly increased mass of metal in the more shallow portion of the boiler after initial heatup. This more uniform heating enables use of a high wattage heating element to produce more rapid boiling over a larger area of the water reservoir in the steam cooker and the relatively shallow overall depth of the boiler quickly raises the temperature of the entire body of water in the reservoir to the cooking temperature without objectionable violent boiling action as discussed above. This arrangement also enables use of a metal body providing a smaller heat sink which helps to avoid temperature overshoot.

While a preferred embodiment of the invention has been disclosed and described in detail, it should be apparent that the invention is not limited solely thereto but rather it is intended to include all embodiments thereof which would be apparent to one skilled in the art and which come within the spirit and scope of the invention.

What is claimed is:

1. In a steam cooker including a base having a bottom wall and sidewalls integrally formed with the bottom wall, the bottom wall having a central opening therethrough, and a water heater mounted in the central opening and forming a fluidtight seal with the bottom wall, the bottom wall, sidewalls and heater cooperating to define a water reservoir, the improvement wherein said water heater comprises a heat conducting metal body having an upwardly directed surface defining a portion of the water reservoir surface and a bottom surface, an elongated generally U-shaped heater channel formed in said bottom surface and extending in a generally circular path, an elongated metal sheathed heating element mounted within said heater channel and having its terminal end portions disposed in generally radially overlapping relation, an annular recess formed in the top surface portion of said metal wall, said annular recess having a first portion of uniform depth defined by a first substantially planar bottom wall portion and a second portion of varying depth defined by a second substantially planar bottom wall portion inclined with respect to the first wall portion, whereby water in said water reservoir will have a greater depth above said first bottom wall portion than above said second bottom wall portion, said inclined wall portion overlaying said overlapped end portions of said heating element.

2. The invention defined in claim 1 wherein said second bottom wall portion has a thickness above said overlapped end portions which is greater than the thickness of said first bottom wall portion.

3. The invention as defined in claim 2 wherein said first and second bottom wall portions intersect substantially along a diameter of said annular recess.

4. The invention as defined in claim 3 further comprising a downwardly open annular channel in said metal body outboard of said heater channel for reducing the flow of heat from said heater element to said bottom wall of said base.

* * * * *